United States Patent [19]

Lenhart

[11] Patent Number: 5,417,525
[45] Date of Patent: May 23, 1995

[54] DEBURRING ATTACHMENT FOR A HONING TOOL

[75] Inventor: Thomas W. Lenhart, Rockton, Ill.

[73] Assignee: Barnes International, Inc., Rockford, Ill.

[21] Appl. No.: 212,512

[22] Filed: Mar. 10, 1994

[51] Int. Cl.⁶ ............................................. B23B 51/00
[52] U.S. Cl. ..................................... 408/24; 408/211; 408/224; 408/708; 408/714; 451/70; 451/54
[58] Field of Search ............... 408/22, 27, 24, 30, 408/54, 81, 82, 83, 93, 94, 145, 154, 211, 224, 708, 714; 51/5 R, 5 B, 5 C, 181 R, 323

[56] References Cited

U.S. PATENT DOCUMENTS

| | | | |
|---|---|---|---|
| 3,940,214 | 2/1976 | Waschek | 408/224 |
| 3,973,861 | 8/1976 | Süssmuth | 408/714 |
| 4,130,371 | 12/1978 | Druxeis | 408/714 |
| 5,000,630 | 3/1991 | Riley et al. | 408/22 |
| 5,181,810 | 1/1993 | Heule | 408/714 |

FOREIGN PATENT DOCUMENTS

| | | | |
|---|---|---|---|
| 89416 | 7/1981 | Japan | 408/22 |
| 780984 | 11/1980 | U.S.S.R. | 408/154 |

OTHER PUBLICATIONS

4-Page brochure published by Burr-Ban Tool Service Company and entitled *Hole Deburring Tools* (Publication date unknown).
Catalog 100 published by Cogsdill Tool Products, Inc. (publication date unknown).

*Primary Examiner*—Daniel W. Howell
*Attorney, Agent, or Firm*—Leydig, Voit & Mayer, Ltd.

[57] ABSTRACT

Burrs formed at the ends of a bore during a honing operation performed by a single pass honing tool are removed by a deburring attachment which is carried on the leading end of the tool. The attachment includes one set of spring-loaded blades which remove burrs at one end of the bore as the tool is retracted from the bore and further includes an axially spaced set of spring-loaded blades which remove burrs at the opposite end of the bore during retraction of the tool.

12 Claims, 3 Drawing Sheets

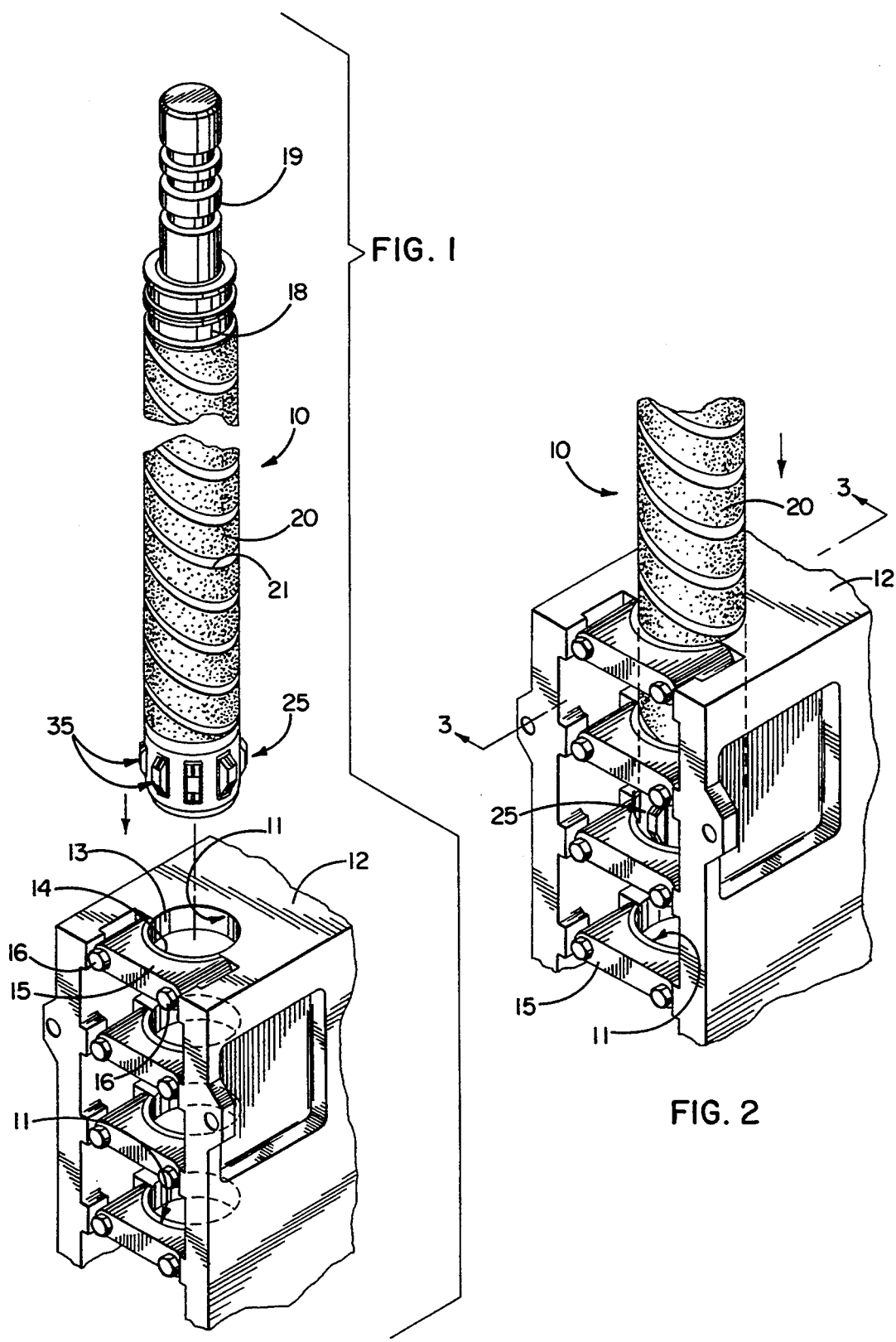

DEBURRING ATTACHMENT FOR A HONING TOOL

BACKGROUND OF THE INVENTION

This invention relates in general to an attachment for a rotatable and reciprocable honing tool which is used to enlarge and smooth one or more bores in a workpiece. More specifically, the invention relates to an attachment for a so-called single pass honing tool of the type which effects smoothing and rounding of the inside diameter of the bore upon being advanced through and then retracted out of the bore in a single back and forth stroke.

Single pass honing tools are frequently used to finish the crankshaft bores of an engine block. One-half of each such bore is defined by journals within the engine block itself while the other half of the bore is defined within a bearing cap which is fastened to the block by screws. Because of tolerance variations and variations in thickness between the bearing caps and the corresponding journals in the block, raised ridges often exist adjacent the ends of the bore at the junctions of the cap with the block.

One problem which results in using a single pass honing tool with certain materials is the creation of generally axially projecting burrs at the ends of each bore. Such burrs are inherently formed at the ends of the bore as the honing tool is advanced through and retracted out of the bore. The burrs must be removed and, in the past, this has been achieved by a separate brushing operation or by hand filing.

SUMMARY OF THE INVENTION

The general aim of the present invention is to provide a new and improved honing tool attachment which is capable of removing burrs during retraction of the honing tool so as to eliminate the need for separate deburring operations.

A further object of the invention is to provide a deburring attachment with cutters which include tapered and compliantly mounted blades in order to avoid damaging of the cutters by any raised ridges at the ends of the bore.

The invention also resides in the unique configuration of the deburring cutters to limit the depth of cut of the cutter blades and thereby avoid breakage of their cutting edges.

These and other objects and advantages of the invention will become more apparent from the following detailed description when taken in conjunction with the accompanying drawings.

BRIEF DESCRIPTION OF THE DRAWINGS

FIG. 1 is a perspective view showing a typical engine block in position to be honed by a single pass honing tool equipped with a new and improved deburring attachment incorporating the unique features of the present invention.

FIG. 2 is a view similar to FIG. 1 but shows the engine block being honed by the tool.

Figure 3:
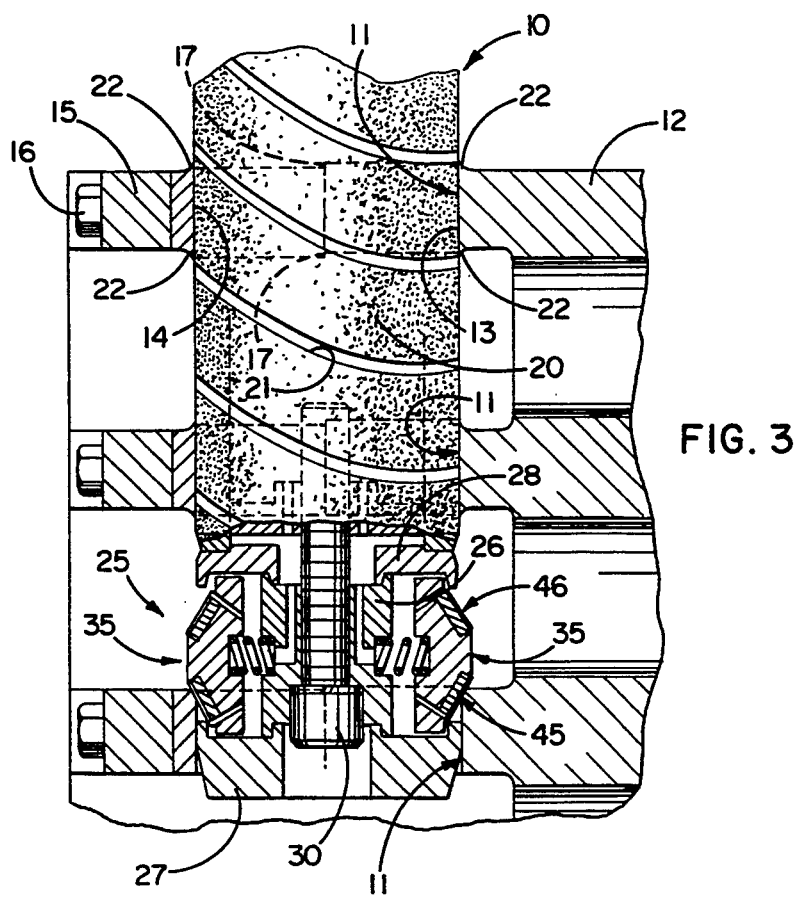
FIG. 3 is an enlarged fragmentary cross-section taken substantially along the line 3—3 of FIG. 2.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings in conjunction with a honing tool 10 for smoothing and rounding bores 11 in a workpiece 12. In this particular instance, the workpiece has been shown as being an engine block having a plurality of axially spaced bores which serve as journals for a crankshaft (not shown).

As is typical, one-half 13 (FIG. 1) of each bore 11 is formed in the block 12 itself. The other half 14 of the bore is defined by the surface of a bearing cap 15 which is fastened to the block by screws 16 during the honing operation and which thereafter is temporarily removed to permit installation of the crankshaft. Because of tolerance variations in the location of the screw holes in the block and the screw holes in the caps and because of thickness variations, the ends of each cap are not necessarily flush with the block at the ends of each bore. Instead, the cap may be offset axially from the block so that stepped ridges 17 (FIG. 3) are created at the ends of each bore where the upper and lower ends of the cap butt against the block.

Herein, the honing tool 10 is a so-called single pass tool having an elongated cylindrical body 18 with a shank 19 at one end thereof, the shank being adapted for coupling to a spindle (not shown) for rotating and reciprocating the hone. The body 18 of the honing tool is coated with diamond abrasive 20 which, when the rotating body is advanced into and retracted from each bore 11, smooths the wall thereof and forms the wall into a nearly perfect cylindrical shape. A helical groove 21 extends around and along the abrasive to provide clearance for particles removed from the wall of the bore.

The honing tool 10 is called a single pass tool in that it hones each bore 11 by first advancing through and then retracting out of the bore rather than being reciprocated upwardly and downwardly through several strokes while located in the bore. Generally axially extending burrs 22 (FIG. 3) are inherently formed at each end of each bore during the single pass honing operation.

In accordance with the present invention, a deburring attachment 25 is connected to the leading end of the honing tool 10 and serves to shave away the burrs 22 as an incident to retraction of the tool from each bore 11. As a result of the attachment 25, burr removal is effected part and parcel with the honing operation itself and without need of a separate brushing or filing operation.

Figure 4:
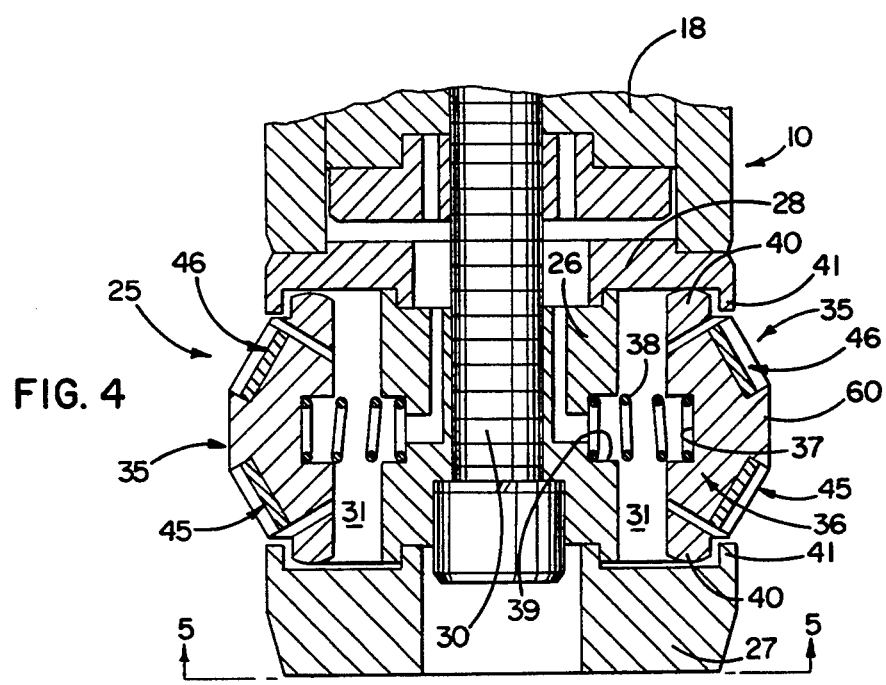
FIG. 4 is an enlarged view of the deburring attachment shown in FIG. 3.
Figure 5:
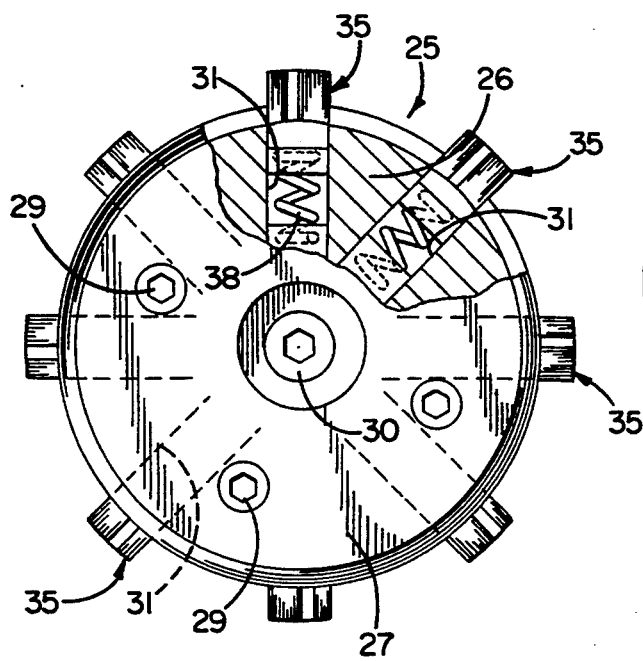
FIG. 5 is an end view of the deburring attachment as seen along the line 5—5 of FIG. 4.

More specifically, the deburring attachment 25 comprises a main body 26 (FIG. 4) which is sandwiched between end caps 27 and 28 and which is clamped to the end caps by angularly spaced screws 29 (FIG. 5). A cap screw 30 extends through the attachment body 26 and clamps the attachment 25 to the lower end of the hone body 18.

As shown most clearly in FIG. 5, the attachment body 26 is formed with a plurality (herein, eight) of angularly spaced slots 31 which open both radially outwardly of the body and axially out of both ends of the body. A cutter 35 is positioned in each slot and is supported for limited radial floating and for limited tilting about an axis extending transversely of the rotational axis of the body. Each cutter includes a steel holder 36 (FIG. 4) having an inner side formed with a pocket 37 for receiving one end portion of a coiled compression spring 38 whose opposite end portion is piloted into a pocket 39 in the body 26. The spring thus urges the holder 36 radially outwardly. Outward movement of the holder is limited by virtue of ears 40 at the upper and lower ends of the holder engaging axially extending flanges 41 on the end caps 27 and 28. When the ears are spaced radially inwardly from the flanges, the holder is capable of tilting about a transversely extending axis.

Figure 6:
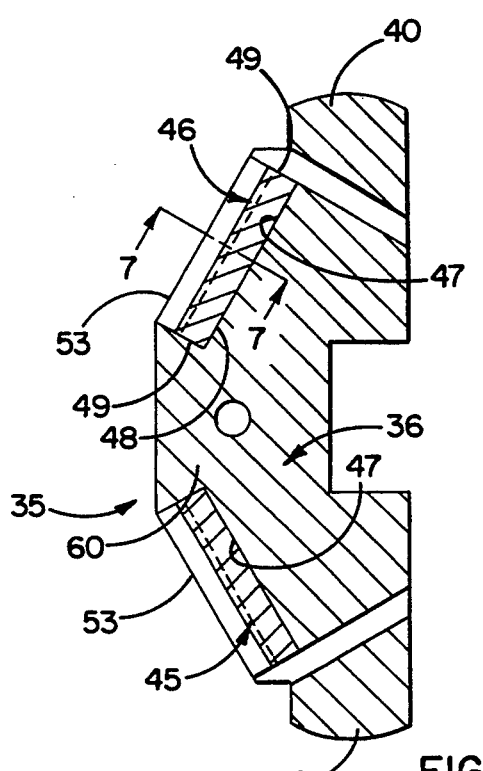
FIG. 6 is an enlarged view of one of the cutters shown in FIG. 4.
Figure 7:
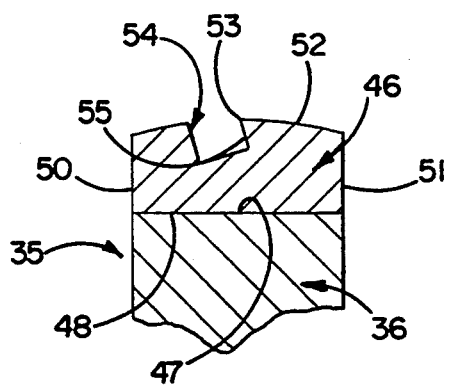
FIG. 7 Is an enlarged fragmentary cross-section taken substantially along the line 7—7 of FIG. 6.
Figure 8:
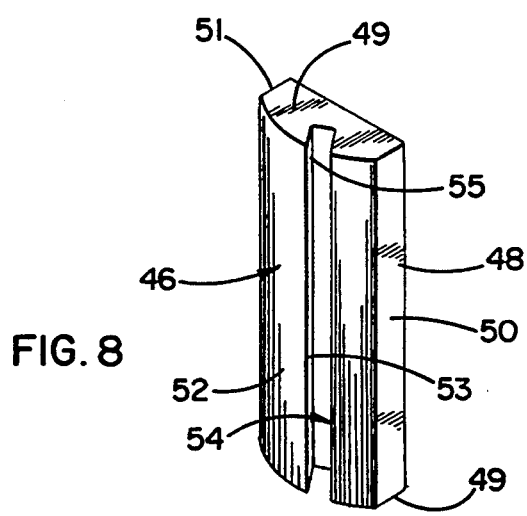
FIG. 8 is a perspective view of one of the cutter blades.

In addition to the holder 36, each cutter 35 comprises upper and lower inserts or blades 45 and 46 (FIG. 6) preferably made of tungsten carbide and brazed or otherwise secured rigidly within pockets 47 in the holder. Each blade is generally in the form of an elongated block and includes a flat inner side 48 and flat ends 49 which seat against flat surfaces of the pocket. Each blade also includes parallel faces 50 and 51 with the face 50 leading the face 51 in the direction of rotation of the attachment 25. The outer face 52 of each blade is convexly curved and is formed with a cutting edge 53 which extends lengthwise of the blade.

Advantageously, each cutting edge 53 is created by forming a lengthwise extending groove 54 in the convex outer face 52 of the respective blade 45, 46. The groove 54 includes a side wall 55 facing in the direction of rotation and defining a cutting face, the cutting edge 53 being defined at the junction of the side wall 55 and the convex outer face 52. The side wall 55 of the groove 54 is angled so as to converge toward the trailing face 51 of the blade as the side wall progresses inwardly. As a result, the cutting edge 53 is disposed at a positive rake angle.

The two blades 45 and 46 of each cutter 35 are positioned in axially spaced relation in the holder 36 and are oppositely inclined relative to the rotational axis of the attachment 25 such that the cutting edges 53 of the two blades converge toward one another upon progressing radially outwardly. Thus, the cutting edges of the two blades of each cutter lie along the legs of a V, the two blades being separated by a nose 60 (FIG. 6) of the holder 36.

As the honing tool 10 is advanced downwardly, it is preceded by the deburring attachment 25 and thus the lower blades 45 of the cutters 35 engage the upper end of each bore 11 prior to the honing tool entering the bore. As the blades 45 enter each bore, the cutters 35 float inwardly as permitted by the springs 38. At the same time, each blade tilts as necessary to accommodate any stepped ridges 17 at the upper end of the bore. As the blades 45 progress downwardly, they chamfer the upper end of each bore and thus provide a lead-in to the bore. Because the cutting edge 53 of each blade is formed at the outer side of the groove 54, the groove limits the depth of cut which the cutting edge may take and thus prevents the cutting edge from breaking away.

Upon continued downward advancement of the honing tool 10, the lower blades 45 move through each bore 11 and, during such movement, are held out of contact with the bore by virtue of the nose 60 of the holder 36 engaging the bore. The upper blades 46 simply pass idly into the bore during the downstroke. As the nose 60 of the holder 36 emerges from the bore during the downstroke, the upper blades 46 are forced outwardly by the springs 38 and form a chamfer at the lower end of the bore.

Thereafter, the honing tool 10 passes first downwardly and then upwardly in each bore 11 and forms the burrs 22. During the upstroke of the tool, the upper blades 46 engage the lower end of the bore and shave away any burrs thereon. The lower blades 45 simply move idly through the bore during the upstroke until the nose 60 of each holder 36 emerges from the upper end of the bore. At that time, the blades 45 are forced outwardly and act to remove any burrs at the upper end of the bore.

From the foregoing, it will be apparent that the present invention brings to the art a new and improved attachment 25 for a hone 10 and operable immediately after the honing operation to remove burrs 22 formed as a result of the honing. The configuration and mounting of the cutters 35 enables burr removal while, at the same time, enabling the attachment to move downwardly into and upwardly out of the bores with stepped ridges 17. The cutting edge 53 of each blade 45, 46 is durable and long-lasting as a result of being located behind the leading face 50 of the blade and being formed as part of a groove 54.

I claim:

1. The combination of, a rotatable and reciprocable honing tool, and a deburring attachment for removing burrs left at opposite ends of a bore which is enlarged by advancing the honing tool through the bore and then retracting the tool out of the bore while rotating the tool, said attachment comprising a body rotatable and reciprocable with the tool and disposed in leading relation with respect to the tool when the latter is advanced, a plurality of cutters spaced circumferentially around said body and each supported by said body for limited radial floating, means urging each cutter radially outwardly while permitting said cutter to float radially inwardly, each of said cutters comprising first and second axially spaced cutting edges facing in the direction of rotation of said body, the cutting edges of each cutter being oppositely inclined relative to the rotational axis of said body such that the cutting edges of each cutter converge toward one another upon progressing radially outwardly.

2. The combination defined in claim 1 in which each cutting edge forms part of a blade made of cutting material, each blade having leading and trailing surfaces with respect to the direction of rotation of said body and having a face which curves convexly upon progressing from said trailing surface toward said leading surface, a groove formed in the convexly curved face of each blade and having a side wall which extends in the same direction as the cutting edge of the blade, the cutting edge of each blade being defined along the junction of said convexly curved face and said side wall.

3. The combination defined in claim 2 in which the side wall of the groove of each blade defines a cutting face and is angled so as to converge toward the trailing surface of the blade as said side wall progresses radially.

4. The combination of, a rotatable and reciprocable honing tool, and a deburring tool for removing burrs left at opposite ends of a bore which is enlarged by advancing the honing tool through the bore and then retracting the tool out of the bore while rotating the tool, said attachment comprising a body rotatable and reciprocable with the tool and disposed in leading relation with respect to the tool when the latter is advanced, a plurality of cutters spaced circumferentially around said body and each supported by said body for limited radial floating and for limited tilting about an axis extending transversely of the rotational axis of the body, means urging each cutter radially outwardly while permitting said cutter to float and tilt, each of said cutters comprising a holder and comprising first and second axially spaced blades attached rigidly to said holder, each of said blades having a cutting edge facing in the direction of rotation of said body, the blades of each cutter being oppositely inclined relative to said rotational axis such that the cutting edges of the two blades converge toward one another upon progressing radially outwardly.

5. The combination defined in claim 4 in which each blade has leading and trailing surfaces with respect to the direction of rotation of said body and has a face which curves convexly upon progressing from said trailing surface toward said leading surface, a groove formed in the convexly curved face of each blade and having a side wall which extends in the same direction as the cutting edge of the blade, the cutting edge of each blade being defined along the junction of said convexly curved face and said side wall.

6. The combination defined in claim 5 in which said side wall of the groove of each blade defines a cutting face and is angled so as to converge toward the trailing surface of the blade as said side wall progresses radially inwardly.

7. The combination defined in claim 4 in which each cutter includes a holder for said blades, each holder having a nose located between the blades and holding said blades out of contact with the wall of said bore when said blades are located between the ends of the bore.

8. A deburring tool for removing burrs at opposite ends of a bore, said tool comprising a rotatable and reciprocable body, a plurality of cutters spaced circumferentially around said body and each supported by said body for limited radial floating, means urging each cutter radially outwardly while permitting said cutter to float radially inwardly, each of said cutters comprising first and second axially spaced cutting edges facing in the direction of rotation of said body, the cutting edges of each cutter being oppositely inclined relative to the rotational axis of said body such that the cutting edges of each cutter converge toward one another upon progressing radially outwardly, each cutting edge forming part of a blade made of cutting material, each blade having leading and trailing surfaces with respect to the direction of rotation of said body and having a face which curves convexly upon progressing from said trailing surface toward said leading surface, a groove formed in the convexly curved face of each blade and having a side wall which extends in the same direction as the cutting edge of the blade, the cutting edge of each blade being defined along the junction of said convexly curved face and said side wall.

9. A deburring tool as defined in claim 8 in which the side wall of the groove of each blade defines a cutting face and is angled so as to converge toward the trailing surface of the blade as said side wall progresses radially.

10. A deburring tool for removing burrs at opposite ends of a bore, said tool comprising a rotatable and reciprocable body, a plurality of cutters spaced circumferentially around said body and each supported by said body for limited radial floating and for limited tilting about an axis extending transversely of the rotational axis of the body, means urging each cutter radially outwardly while permitting said cutter to float and tilt, each of said cutters comprising a holder and comprising first and second axially spaced blades attached rigidly to said holder, each of said blades having a cutting edge facing in the direction of rotation of said body, the blades of each cutter being oppositely inclined relative to said rotational axis such that the cutting edges of the two blades converge toward one another upon progressing radially outwardly, each blade having leading and trailing surfaces with respect to the direction of rotation of said body and having a face which curves convexly upon progressing from said trailing surface toward said leading surface, a groove formed in the convexly curved face of each blade and having a side wall which extends in the same direction as the cutting edge of the blade, the cutting edge of each blade being defined along the junction of said convexly curved face and said side wall.

11. A deburring tool as defined in claim 10 in which said side wall of the groove of each blade defines a cutting face and is angled so as to converge toward the trailing surface of the blade as said side wall progresses radially inwardly.

12. A deburring tool as defined in claim 10 in which each cutter includes a holder for said blades, each holder having a nose located between the blades and holding said blades out of contact with the wall of said bore when said blades are located between the ends of the bore.

* * * * *